US010264298B2

(12) United States Patent
Tanaka et al.

(10) Patent No.: US 10,264,298 B2
(45) Date of Patent: Apr. 16, 2019

(54) MULTIPLEXING APPARATUS, RECEIVING APPARATUS, MULTIPLEXING METHOD, AND DELAY ADJUSTMENT METHOD

(71) Applicant: Kabushiki Kaisha Toshiba, Minato-ku, Tokyo (JP)

(72) Inventors: Tatsuya Tanaka, Kawasaki Kanagawa (JP); Tomoo Yamakage, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 142 days.

(21) Appl. No.: 15/269,515

(22) Filed: Sep. 19, 2016

(65) Prior Publication Data

US 2017/0048560 A1    Feb. 16, 2017

Related U.S. Application Data

(63) Continuation of application No. PCT/JP2015/054335, filed on Feb. 17, 2015.

(30) Foreign Application Priority Data

Mar. 24, 2014    (JP) ................................. 2014-060756

(51) Int. Cl.
*H04N 21/236* (2011.01)
*H04N 21/242* (2011.01)
*H04N 21/8547* (2011.01)

(52) U.S. Cl.
CPC ......... *H04N 21/236* (2013.01); *H04N 21/242* (2013.01); *H04N 21/8547* (2013.01)

(58) Field of Classification Search
None
See application file for complete search history.

(56) References Cited

U.S. PATENT DOCUMENTS 5,467,342 A * 11/1995 Logston ................ H04J 3/0632
370/253
6,049,551 A * 4/2000 Hinderks .............. H04J 3/1682
348/388.1

(Continued)

FOREIGN PATENT DOCUMENTS

JP    2003-163897 A    6/2003
JP    2009-231920 A    10/2009
JP    2013-009326 A    1/2013

OTHER PUBLICATIONS

Association of Radio Industries and Businesses Digital Hoso Systems Kaihatsu Bukai, Ministry of Internal Affairs and Communications Information and Communications Council, Mar. 1, 2014, 59 pages.

(Continued)

*Primary Examiner* — Fernando Alcon
(74) *Attorney, Agent, or Firm* — Knobbe, Martens, Olson & Bear, LLP

(57) ABSTRACT

A multiplexing apparatus includes processing circuitry. The processing circuitry multiplexes a plurality of MMT packets including at least one MMT packet to which first output time information representing a first output time and presentation time information representing a presentation time are added. The processing circuitry rewrites the first output time information to second output time information representing a second output time. The processing circuitry adds a time necessary to multiplex the plurality of MMT packets to the presentation time represented by the presentation time information as a delay time.

7 Claims, 11 Drawing Sheets

(56) References Cited

U.S. PATENT DOCUMENTS

| | | | |
|---|---|---|---|
| 6,266,384 B1* | 7/2001 | Acampora | H04N 21/4307 370/517 |
| 8,731,053 B2* | 5/2014 | Karegoudar | H04N 19/46 375/240.01 |
| 2003/0007488 A1* | 1/2003 | Rao | H04L 29/06027 370/390 |
| 2003/0053492 A1* | 3/2003 | Matsunaga | H04H 20/06 370/537 |
| 2005/0190872 A1* | 9/2005 | Seong | H04N 21/23608 375/354 |
| 2013/0016282 A1 | 1/2013 | Kim et al. | |
| 2013/0094545 A1* | 4/2013 | Park | H04N 21/236 375/219 |
| 2013/0094563 A1* | 4/2013 | Bae | H04N 21/236 375/240.01 |
| 2013/0173826 A1 | 7/2013 | Kim et al. | |
| 2015/0163524 A1* | 6/2015 | Hamzeh | H04W 4/18 725/116 |
| 2016/0100211 A1* | 4/2016 | Toma | H04N 21/8547 725/116 |
| 2016/0337671 A1* | 11/2016 | Ricard | H04N 21/234327 |

OTHER PUBLICATIONS

K. Park, et al., "Study of ISO/IEC CD 23008-1, MPEG Media Transport," http://mpeg.chiariglione.org/standars/mpeg-h/mpeg-media-transport/study-isoiec-cd-23008-1-mpeg-media-transport, Oct. 2012—125 pages.

Kwang-deok Seo, et al., A New Timing Model Design for MPEG Media Transport (MMT), IEEE International Symposium on Broadband Multimedia Systems and Broadcasting (BMSB 2012), IEEE, Jun. 27, 2012—5 pages.

S. Aoki et, al., "Effective Usage of MMT in Broadcasting Systems," IEEE International Symposium on Broadband Multimedia Systems and Broadcasting (BMSB 2013), IEEE, Jun. 5, 2013—6 pages.

S. Aoki, "Media Transport Technologies for Next Generation Broadcasting Systems," NHK STRL R&D No. 140, Jul. 2013, pp. 22-31.

International Search Report dated May 26, 2015 issued in the corresponding PCT application No. PCT/JP2015/054335, including written opinion (Japanese language only)—10 pages.

Background Art Information—1 page.

English Translation of International Preliminary Report on Patentability mailed by the International Bureau of WIPO dated Oct. 6, 2016 in the corresponding PCT application No. PCT/JP2015/054335—7 pages.

\* cited by examiner

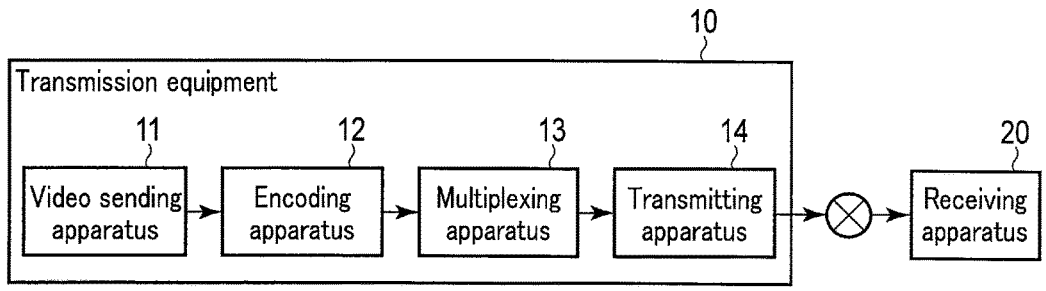
FIG. 1
| Data structure | Number of bits | Data notation |
|---|---|---|
| MPU_Timestamp_descriptor() { | | |
|     descriptor_tag | 16 | uimsbf |
|     descriptor_length | 8 | uimsbf |
|     for (i=0; i<N; i++) { | | |
|         mpu_sequence_number | 32 | uimsbf |
|         mpu_presentation_time | 64 | uimsbf |
|         mpu_presentation_time_offset | x | uimsbf |
|         layout_number | 8 | uimsbf |
|         region_number | 8 | uimsbf |
|     } | | |
| } | | |
FIG. 2
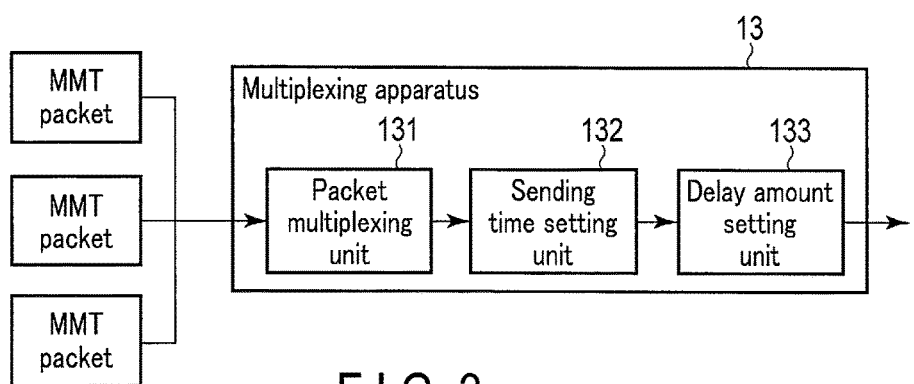
FIG. 3

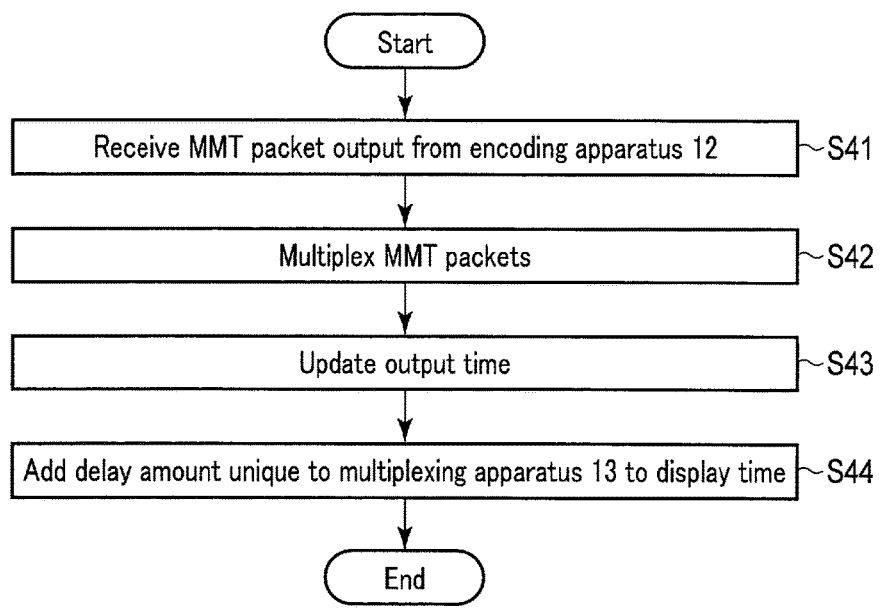
F I G. 4
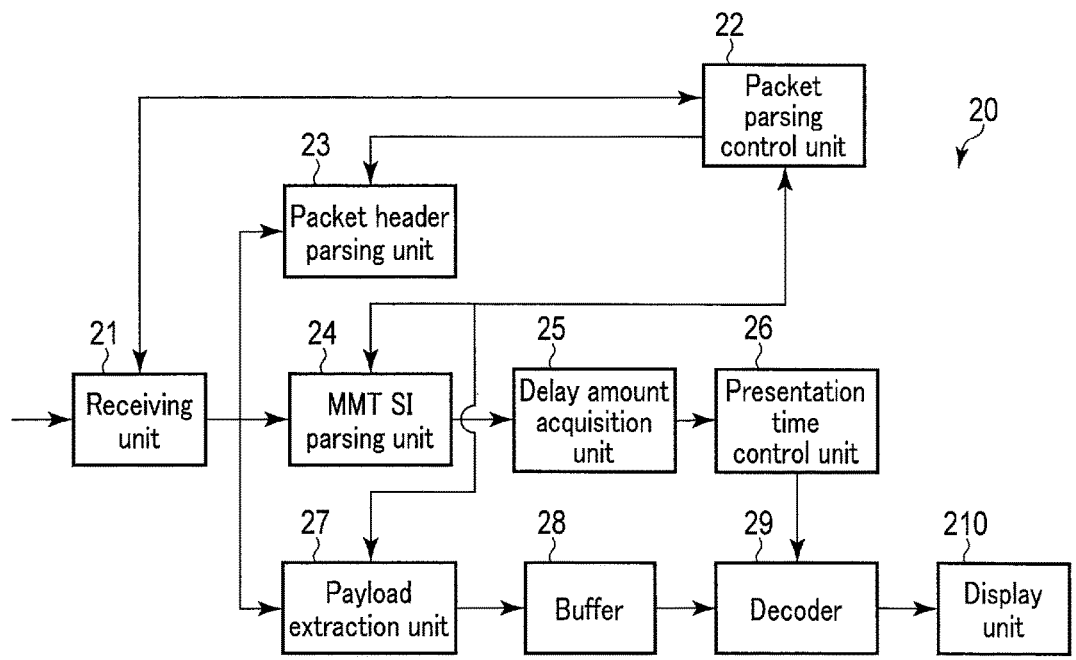
F I G. 5

| Data structure | Number of bits | Data notation |
|---|---|---|
| MPU_timestamp_descriptor() { | | |
|     descriptor_tag | 16 | uimsbf |
|     descriptor_length | 8 | uimsbf |
|     for (i=0;i<N;i++) { | | |
|         mpu_sequence_number | 32 | uimsbf |
|         mpu_presentation_time | 64 | uimsbf |
|     } | | |
| } | | |

FIG. 8

| Data structure | Number of bits | Data notation |
|---|---|---|
| MPU_presentation_time_offset_descriptor() { | | |
|     descriptor_tag | 16 | uimsbf |
|     descriptor_length | 8 | uimsbf |
|     for (i=0;i<N;i++) { | | |
|         mpu_presentation_time_offset | X | uimsbf |
|     } | | |
| } | | |

FIG. 9

| Data structure | Number of bits | Data notation |
|---|---|---|
| MPU_presentation_time_offset_descriptor() { | | |
|     descriptor_tag | 16 | uimsbf |
|     descriptor_length | 8 | uimsbf |
|     mpu_presentation_time_offset | X | uimsbf |
| } | | |

FIG. 10

| Data structure | Number of bits | Data notation |
|---|---|---|
| MP_table() { | | |
|     table_id | 8 | uimsbf |
|     version | 8 | uimsbf |
|     length | 16 | uimsbf |
|     (...) | | |
|     MP_table_descriptors { | | |
|         MP_table_descriptors_length | 16 | uimsbf |
|         for (i=0; i<N2; i++) { | | |
|             MP_table_descriptors_byte | 8 | uimsbf |
|         } | | |
|     } | | |
|     (...) | | |
|     number_of_assets | 8 | uimsbf |
|     for (i=0; i<N3; i++) { | | |
|         (...) | | |
|         asset_descriptors { | | |
|         asset_descriptors_length | 16 | uimsbf |
|             for (j=0; j<N5; j++) { | | |
|                 asset_descriptors_byte | 8 | uimsbf |
|             } | | |
|         } | | |
|     } | | |
| } | | |

FIG. 11

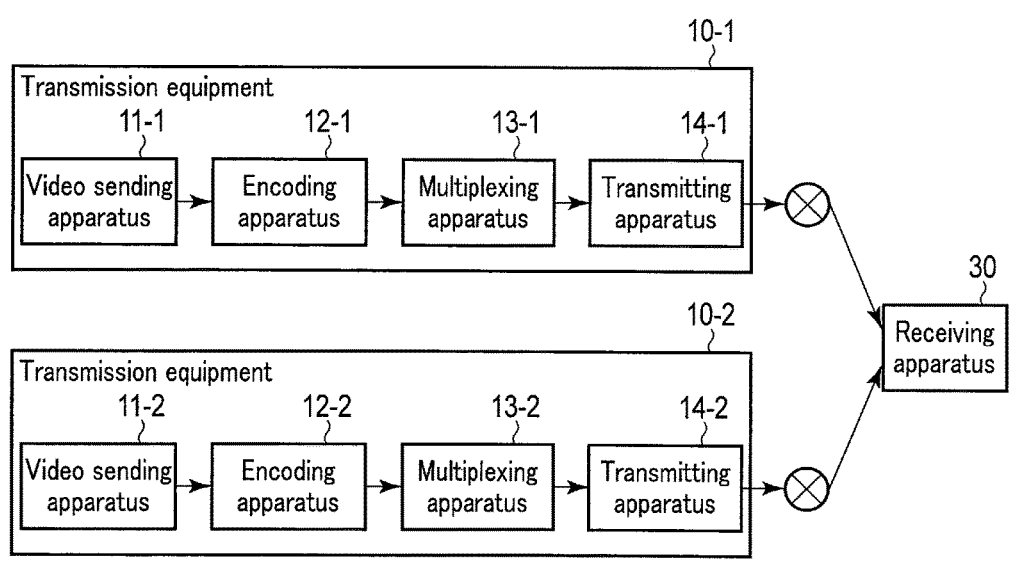
F I G. 12

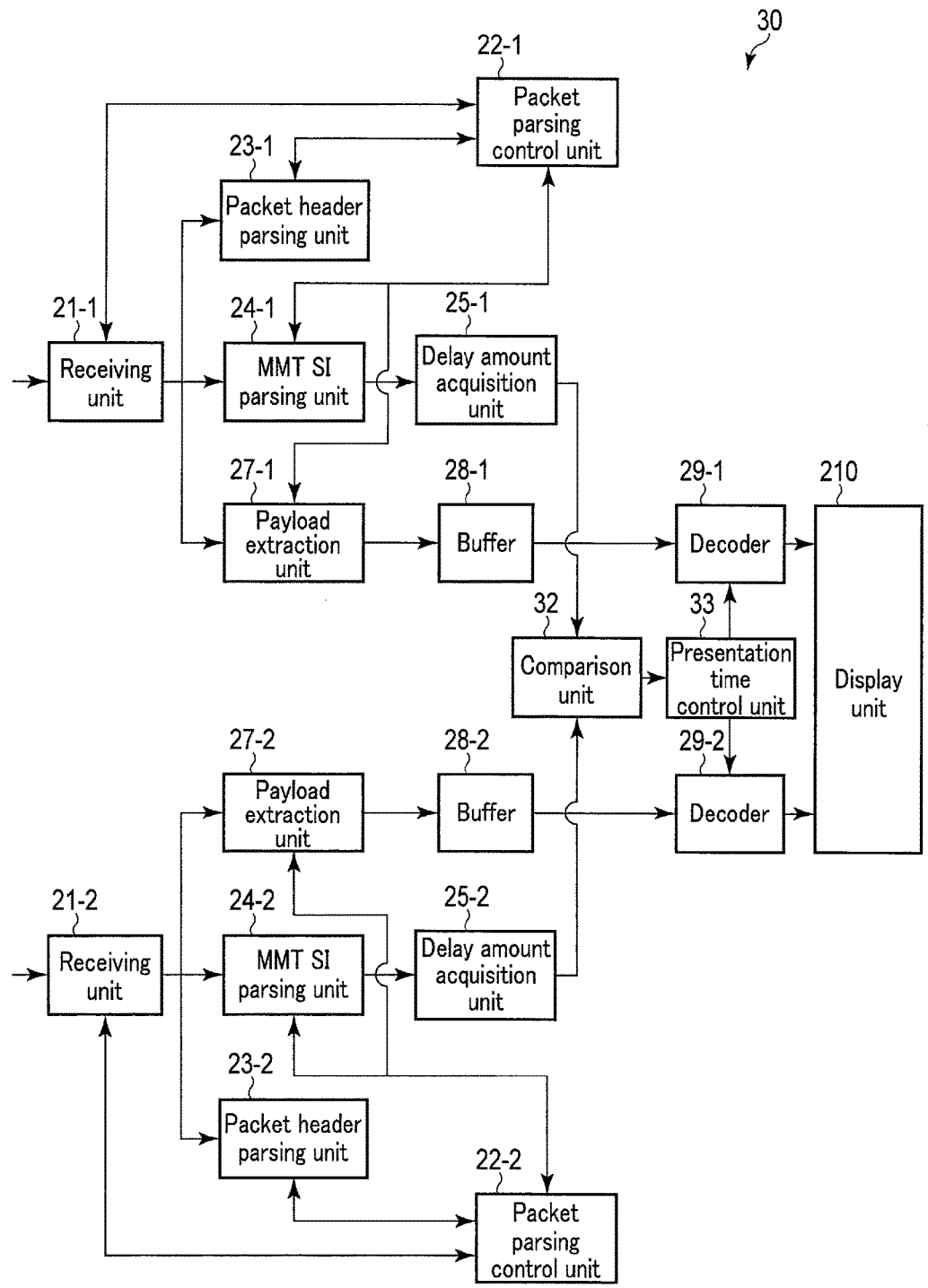
F I G. 16

MULTIPLEXING APPARATUS, RECEIVING APPARATUS, MULTIPLEXING METHOD, AND DELAY ADJUSTMENT METHOD

CROSS-REFERENCE TO RELATED APPLICATIONS

This application is a Continuation Application of PCT Application No. PCT/JP2015/054335, filed Feb. 17, 2015 and based upon and claims the benefit of priority from the prior Japanese Patent Application No. 2014-060756, filed Mar. 24, 2014, the entire contents of both which are incorporated herein by reference.

FIELD

Embodiments described herein relate generally to a multiplexing apparatus and a receiving apparatus used in a broadcasting system that transmits data using MMT (MPEG Multimedia Transport), and a multiplexing method and a delay adjustment method used by these apparatuses.

BACKGROUND

In current broadcasting systems, the MPEG-2 TS (Moving Picture Experts Group-2 Transport Stream) and RTP (Real-time Transport Stream) media transport schemes are widely used. There are various limits to these schemes when making broadcasting and communication cooperate. MMT (MPEG Multimedia Transport) that is a new media transport scheme assuming use of various networks using MPEG has been proposed.

In a broadcasting system that employs MMT, a receiving apparatus receives an MMT stream transmitted from transmission equipment. The transmission equipment includes, for example, a video sending apparatus, an encoding apparatus, a multiplexing apparatus, and a transmitting apparatus. The multiplexing apparatus multiplexes MMT packets output from the encoding apparatus. The transmitting apparatus transmits the multiplexed MMT packet as an MMT stream. When outputting an MMT packet to the transmitting apparatus, the multiplexing apparatus adds a time stamp representing an output time Tt to the MMT packet. Note that a time stamp representing a presentation time Tp of an MPU (Media Processing Unit) formed from the payload of the MMT packet is added to an SI (Service Information) packet included in the MMT packet.

The receiving apparatus receives the transmitted MMT stream. At this time, because of the influence of the transmission channel, the MMT stream received by the receiving apparatus has a delay $\Delta d$ with respect to the output time Tt at which the multiplexing apparatus outputs the MMT packet. The receiving apparatus compares the time of reception of the MMT stream with the time stamp added to the MMT packet, thereby grasping the transmission delay $\Delta d$. The receiving apparatus starts displaying the MMT stream at time Tp+$\Delta d$ obtained by adding the transmission delay $\Delta d$ to the presentation time Tp represented by the time stamp added to the SI packet.

However, a delay may be caused by the multiplexing processing of the multiplexing apparatus, or the like. If the MMT packet cannot arrive at the presentation time Tp+$\Delta d$ due to the delay caused by the multiplexing processing or the like, that is, in a buffer underflow state, display of the MMT stream cannot be started.

BRIEF DESCRIPTION OF THE DRAWINGS

FIG. 1 is a block diagram showing the functional arrangement of a broadcasting system provided with a multiplexing apparatus and a receiving apparatus according to the first embodiment.

FIG. 2 is a syntax chart showing an example of an MPU_timestamp_descriptor added to an MMT packet output from the multiplexing apparatus shown in FIG. 1.

FIG. 3 is a block diagram showing the functional arrangement of the multiplexing apparatus shown in FIG. 1.

FIG. 4 is a flowchart performed when the multiplexing apparatus shown in FIG. 3 updates the output time and writes the delay amount of the presentation time.

FIG. 5 is a block diagram showing the functional arrangement of the receiving apparatus shown in FIG. 1.

FIG. 8 is a syntax chart showing another example of the "MPU_timestamp_descriptor" shown in FIG. 2.

FIG. 9 is a syntax chart showing an example of an MPU presentation time offset descriptor in a case in which the MPU_timestamp_descriptor includes the information shown in FIG. 8.

FIG. 10 is a syntax chart showing another example of the MPU presentation time offset descriptor shown in FIG. 9.

FIG. 11 is a syntax chart showing an MP table that stores the MPU_timestamp_descriptor or the MPU presentation time offset descriptor.

FIG. 12 is a block diagram showing the functional arrangement of a broadcasting system provided with a receiving apparatus according to the second embodiment.

FIG. 16 is a block diagram showing another functional arrangement of the receiving apparatus shown in FIG. 12.

DETAILED DESCRIPTION

Figure 6:
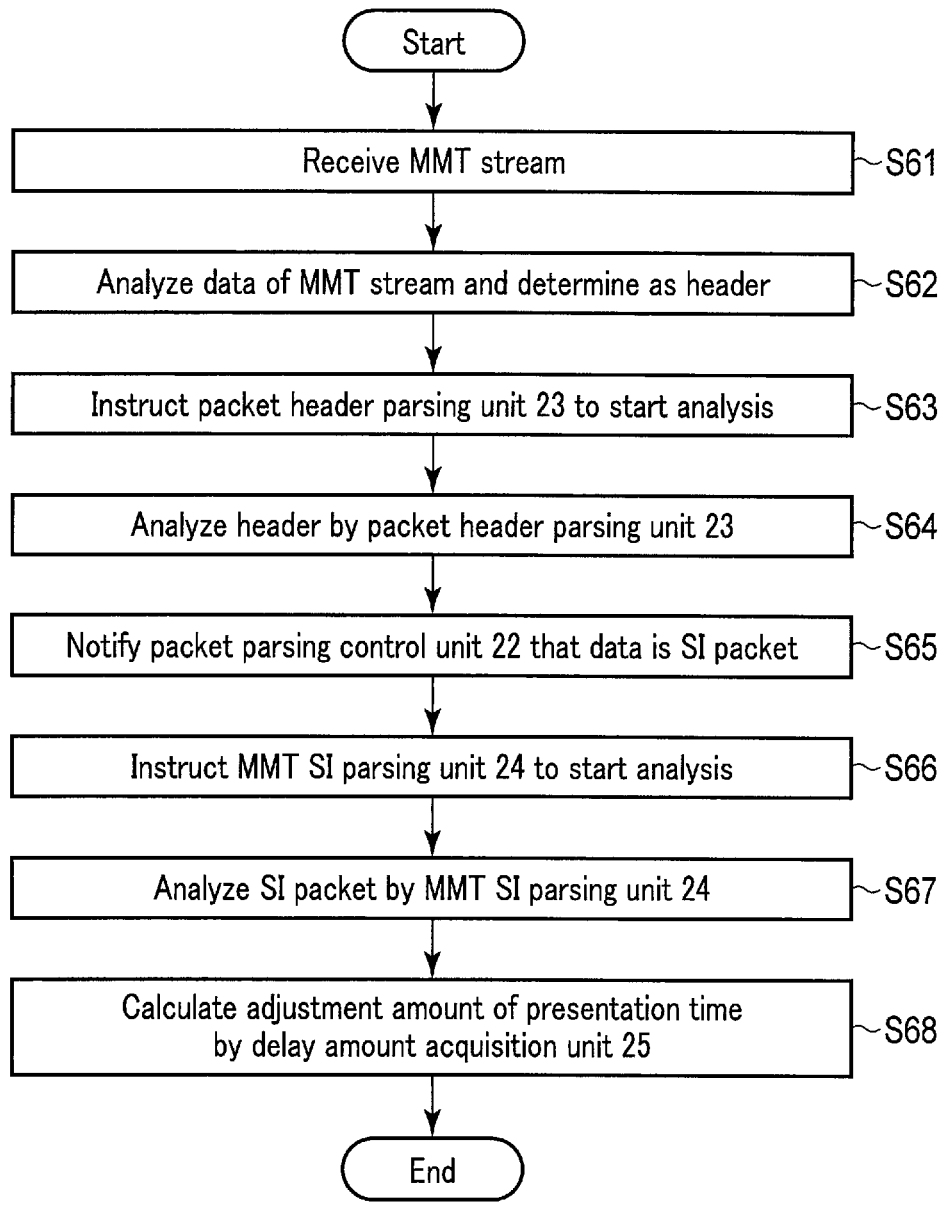
FIG. 6 is a flowchart performed when the receiving apparatus shown in FIG. 5 sets the adjustment amount of the presentation time of a video.

In general, according to an embodiment, a multiplexing apparatus includes processing circuitry. The processing circuitry multiplexes a plurality of MMT packets including at least one MMT packet to which first output time information representing a first output time at which the MMT packet is output from another apparatus and presentation time information representing a presentation time at which an accessible data unit formed from a payload is displayed are added. The processing circuitry rewrites the first output time information to second output time information representing a second output time at which the MMT packet is output. The processing circuitry adds a time necessary to multiplex the plurality of MMT packets to the presentation time represented by the presentation time information as a delay time, and outputs the MMT packet multiplexed by the packet multiplexing unit.

The embodiments will be described with reference to the accompanying drawings.

First Embodiment

FIG. 1 is a block diagram showing an example of the functional arrangement of a broadcasting system provided with a multiplexing apparatus and a receiving apparatus according to the first embodiment. The broadcasting system shown in FIG. 1 includes transmission equipment 10 and a receiving apparatus 20. The transmission equipment 10 transmits an MMT (MPEG Multimedia Transport) stream. The transmitted MMT stream arrives at the receiving apparatus 20 via a transmission channel such as a broadcasting network. The receiving apparatus 20 receives the MMT stream.

The transmission equipment 10 includes a video sending apparatus 11, an encoding apparatus 12, a multiplexing apparatus 13, and a transmitting apparatus 14.

The video sending apparatus 11 includes, for example, a CPU (Central Processing Unit), an FPGA (Field Programmable Gate Array) that executes predetermined processing under the control of the CPU, and a storage memory used to store data. Note that the video sending apparatus 11 may include an LSI (Large-Scale Integration) in place of the FPGA. The video sending apparatus 11 may execute predetermined processing by software processing of the CPU. The video sending apparatus 11 indicates, for example, an image capturing apparatus such as a camera and a server for archiving video/audio data. The video sending apparatus 11 outputs the video/audio data to the encoding apparatus 12.

The encoding apparatus 12 includes, for example, a CPU, an FPGA that executes predetermined processing under the control of the CPU, and the like. Note that the encoding apparatus 12 may include an LSI in place of the FPGA. The encoding apparatus 12 may execute predetermined processing by software processing of the CPU. The encoding apparatus 12 encodes the video/audio data supplied from the video sending apparatus 11 in accordance with a protocol corresponding to MMT, thereby converting the video/audio data into an MMT packet.

The MMT packet includes a packet including video/audio data and an SI (Service Information) packet. The SI packet includes MMT configuration information. The MMT configuration information is information about the configuration of an MMT packet including the configuration of program information and video/audio data. A time stamp representing a presentation time Tp of an MPU (Media Processing Unit) formed from the payload of the MMT packet is added to the SI packet. The encoding apparatus 12 outputs the MMT packet to the multiplexing apparatus 13. The encoding apparatus 12 adds a time stamp representing an output time Tt1 to the MMT packet to be output.

A "MPU_timestamp_descriptor" representing the presentation time Tp is defined as in, for example, FIG. 2. The "MPU_timestamp_descriptor" shown in FIG. 2 is provided with a syntax element capable of writing a delay amount to be described later, for example, "mpu_presentation_time_offset".

The multiplexing apparatus 13 includes, for example, CPU, an FPGA that executes predetermined processing under the control of the CPU, and the like. The multiplexing apparatus 13 implements functions shown in FIG. 3 by causing the CPU to execute functions designed by the FPGA. FIG. 3 is a block diagram showing an example of the functional arrangement of the multiplexing apparatus 13 shown in FIG. 1. The multiplexing apparatus 13 shown in FIG. 3 implements the functions of a packet multiplexing unit 131, a sending time setting unit 132, and a delay amount setting unit 133. Note that the multiplexing apparatus 13 may include an LSI in place of the FPGA, thereby implementing the functions shown in FIG. 3. The multiplexing apparatus 13 may implement the functions shown in FIG. 3 by software processing of the CPU.

The packet multiplexing unit 131 multiplexes MMT packets output from the encoding apparatus 12. Note that in FIG. 1, the multiplexing apparatus 13 is configured to multiplex MMT packets output from the single encoding apparatus 12. However, the multiplexing apparatus 13 may receive a plurality of MMT packets output from encoding apparatuses of different media.

The sending time setting unit 132 acquires an output time Tt2 to output the multiplexed MMT packet to the transmitting apparatus 14 in accordance with the NTP (Network Time Protocol). The sending time setting unit 132 rewrites the output time Tt1 written to the time stamp of the MMT packet multiplexed by the packet multiplexing unit 131 to the acquired output time Tt2.

The delay amount setting unit 133 records a delay amount $\Delta t$ unique to the multiplexing apparatus 13 in advance. The delay amount $\Delta t$ is, for example, a time needed for the multiplexing processing of the packet multiplexing unit 131. The delay amount setting unit 133 adds the delay amount $\Delta t$ to "mpu_presentation_time_offset" of the "MPU_timestamp_descriptor" of the SI packet. Accordingly, the presentation time changes to $Tp+\Delta t$.

Note that the delay amount setting unit 133 may calculate a delay caused by transmission from the encoding apparatus 12 to the multiplexing apparatus 13 and add the delay to the delay amount $\Delta t$. At this time, the packet multiplexing unit 131 acquires the reception time of the multiplexed MMT packet in accordance with the NTP. The delay amount setting unit 133 compares the time of reception of the MMT packet with the output time Tt1, thereby acquiring a transmission delay $\Delta t'$. The delay amount setting unit 133 writes a delay amount that is the sum of the delay amount $\Delta t$ and the transmission delay $\Delta t'$ to "mpu_presentation_time_offset" of the "MPU_timestamp_descriptor" of the SI packet, and executes the following processing.

The transmitting apparatus 14 includes, for example, a CPU, an FPGA that executes predetermined processing under the control of the CPU, and the like. Note that the transmitting apparatus 14 may include an LSI in place of the FPGA. The transmitting apparatus 14 may execute predetermined processing by software processing of the CPU. The transmitting apparatus 14 performs transmission processing for the MMT packet output from the multiplexing apparatus 13. The transmitting apparatus 14 transmits the MMT packet that has undergone the transmission processing as an MMT stream.

FIG. 4 is a flowchart performed when the multiplexing apparatus 13 shown in FIG. 3 updates the output time and writes the delay amount of the presentation time. First, the packet multiplexing unit 131 receives MMT packets output from the encoding apparatus 12 (step S41). The packet multiplexing unit 131 multiplexes the MMT packets (step S42).

Next, the sending time setting unit 132 rewrites the output time Tt1 written to the time stamp to the output time Tt2 at which the sending time setting unit 132 outputs the MMT packet (step S43). The delay amount setting unit 133 adds the delay amount $\Delta t$ unique to the multiplexing apparatus 13 to "mpu_presentation_time_offset" of the "MPU_timestamp_descriptor" of the SI packet (step S44).

The receiving apparatus 20 includes, for example, a CPU, an FPGA that executes predetermined processing under the control of the CPU, a storage memory used to store data, and the like. The receiving apparatus 20 implements functions shown in FIG. 5 by causing the CPU to execute functions designed by the FPGA. FIG. 5 is a block diagram showing an example of the functional arrangement of the receiving apparatus 20 shown in FIG. 1. The receiving apparatus 20 shown in FIG. 5 implements the functions of a receiving unit 21, a packet parsing control unit 22, a packet header parsing unit 23, an MMT-SI parsing unit 24, a delay amount acquisition unit 25, a presentation time control unit 26, a payload extraction unit 27, a buffer 28, a decoder 29, and a display unit 210. Note that the receiving apparatus 20 may include an LSI in place of the FPGA, thereby implementing the functions shown in FIG. 5. The receiving apparatus 20 may implement the functions shown in FIG. 5 by software processing of the CPU.

The receiving unit 21 receives an MMT stream that arrives via a transmission channel. The receiving unit 21 outputs the received MMT stream to the packet parsing control unit 22. The receiving unit 21 also outputs the data of the received MMT stream to the packet header parsing unit 23, the MMT-SI parsing unit 24, or the payload extraction unit 27 in accordance with a control signal from the packet parsing control unit 22.

That is, when a control signal representing that the data of the received MMT stream is the header of an MMT packet is received from the packet parsing control unit 22, the receiving unit 21 outputs the data of the received MMT stream to the packet header parsing unit 23. When a control signal representing that the MMT packet included in the received MMT stream is an SI packet is received from the packet parsing control unit 22, the receiving unit 21 outputs the data of the received MMT stream to the MMT-SI parsing unit 24. When a control signal representing that the MMT packet included in the received MMT stream is a packet including video/audio data is received from the packet parsing control unit 22, the receiving unit 21 outputs the data of the received MMT stream to the payload extraction unit 27.

The packet parsing control unit 22 controls the receiving unit 21, the packet header parsing unit 23, the MMT-SI parsing unit 24, and the payload extraction unit 27 in accordance with the data structure of the received MMT stream.

That is, the packet parsing control unit 22 analyzes the received MMT stream, and upon determining that the received data is the header of an MMT packet, outputs, to the receiving unit 21, a control signal representing that the data of the received MMT stream is the header of an MMT packet. The packet parsing control unit 22 outputs an instruction to the packet header parsing unit 23 to start analysis of supplied data.

If the packet header parsing unit 23 determines that the header is the header of an SI packet, the packet parsing control unit 22 outputs, to the receiving unit 21, a control signal representing that the MMT packet included in the received MMT stream is an SI packet. The packet parsing control unit 22 outputs an instruction to the MMT-SI parsing unit 24 to start analysis of supplied data. The MMT-SI parsing unit 24 returns MMT configuration information that is information about the configuration of the MMT packet.

If the packet header parsing unit 23 determines that the header is the header of a packet including video/audio data, the packet parsing control unit 22 outputs, to the receiving unit 21, a control signal representing that the MMT packet included in the received MMT stream is a packet including video/audio data. The packet parsing control unit 22 outputs an instruction to the payload extraction unit 27 to start extracting a payload from the MMT packet using the MMT configuration information interpreted by the MMT-SI parsing unit 24.

Upon receiving an analysis start instruction from the packet parsing control unit 22, the packet header parsing unit 23 analyzes the data of the header of the MMT packet output from the receiving unit 21. Upon determining by the header analysis that the header is the header of an SI packet, the packet header parsing unit 23 outputs, to the packet parsing control unit 22, a notification representing that the header is the header of an SI packet. Upon determining by the header analysis that the header is the header of a packet including video/audio data, the packet header parsing unit 23 outputs, to the packet parsing control unit 22, a notification representing that the header is the header of a packet including video/audio data.

Upon receiving an analysis start instruction from the packet parsing control unit 22, the MMT-SI parsing unit 24 analyzes the data of the SI packet output from the receiving unit 21. The MMT-SI parsing unit 24 analyzes the data, thereby interpreting the MMT configuration information. The MMT-SI parsing unit 24 outputs the interpreted MMT configuration information to the packet parsing control unit 22.

The delay amount acquisition unit 25 reads the presentation time $Tp+\Delta t$ and the output time $Tt2$ from the time stamp added to the SI packet. The delay amount acquisition unit 25 compares the output time $Tt2$ with the reception time of the MMT packet acquired based on the NTP, and calculates a delay time $\Delta d$ by the transmission channel. The delay amount acquisition unit 25 outputs $\Delta t+\Delta d$ to the presentation time control unit 26 as the adjustment amount of the presentation time.

The presentation time control unit 26 controls the decoder 29 to start display at the time $Tp+\Delta t+\Delta d$ considering the adjustment amount acquired by the delay amount acquisition unit 25.

Upon receiving an extraction start instruction from the packet parsing control unit 22, the payload extraction unit 27 analyzes the data of the packet including video/audio data output from the receiving unit 21 by referring to the MMT configuration information. The payload extraction unit 27 analyzes the data of the packet, thereby extracting the video/audio data (payload) from the packet. The payload extraction unit 27 causes the buffer 28 to hold the extracted payload.

Upon receiving a display start instruction from the presentation time control unit 26, the decoder 29 reads the payload from the buffer 28, and decodes the read payload. The decoder 29 causes the display unit 210 to display the decoded data.

FIG. 6 is a flowchart performed when the receiving apparatus 20 shown in FIG. 5 sets the adjustment amount of the presentation time of a video. First, the receiving unit 21 receives an MMT stream that arrives via a transmission channel (step S61). The receiving unit 21 outputs the data of the received MMT stream to the packet parsing control unit 22.

The packet parsing control unit 22 analyzes the data of the received MMT stream, and determines that the data is the header of an MMT packet (step S62). Upon determining that the received data is the header of an MMT packet, the packet parsing control unit 22 outputs a control signal representing that the received data is the header of an MMT packet to the receiving unit 21, and also outputs an instruction to the packet header parsing unit 23 to start analysis of supplied data (step S63).

The packet header parsing unit 23 receives the data of the header from the receiving unit 21, and analyzes the received header (step S64). Upon determining that the packet to which the received header is added is an SI packet, the packet header parsing unit 23 outputs a notification representing it to the packet parsing control unit 22 (step S65). If the packet header parsing unit 23 determines that the header is the header of an SI packet, the packet parsing control unit 22 outputs, to the receiving unit 21, a control signal representing that the packet included in the received MMT stream is an SI packet, and also outputs an instruction to the MMT-SI parsing unit 24 to start analysis of supplied data (step S66).

Upon receiving the analysis start instruction from the packet parsing control unit 22, the MMT-SI parsing unit 24 analyzes the data of the SI packet output from the receiving unit 21 (step S67). The MMT-SI parsing unit 24 analyzes the data, thereby interpreting the MMT configuration information.

The delay amount acquisition unit 25 reads the presentation time Tp+Δt and the output time Tt2 from the time stamp added to the SI packet. The delay amount acquisition unit 25 compares the output time Tt2 with the reception time of the MMT packet acquired based on the NTP, and calculates the delay time Δd by the transmission channel. The delay amount acquisition unit 25 calculates Δt+Δd as the adjustment amount of the presentation time (step S68).

Figure 7:
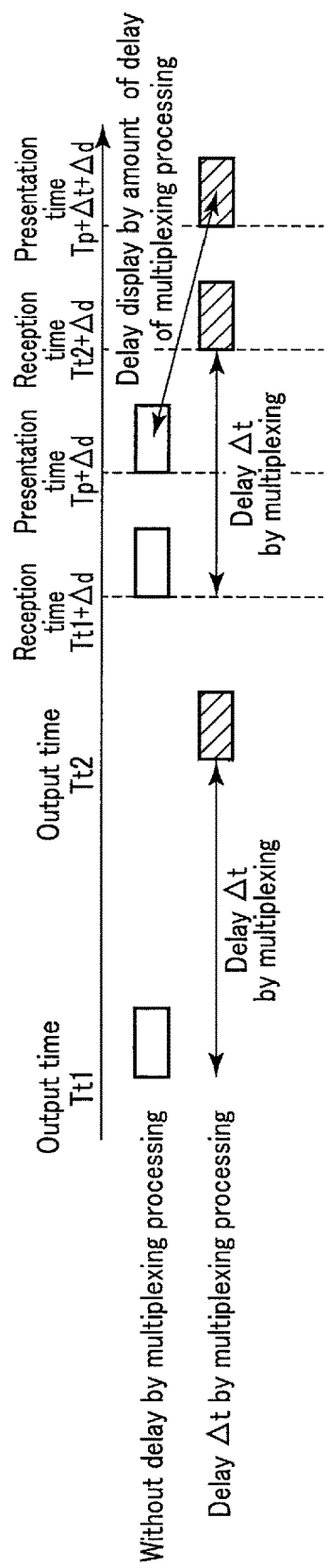
FIG. 7 is a schematic diagram showing a packet output time, a packet reception time, and a presentation time.

FIG. 7 is a schematic diagram showing a packet output time, a packet reception time, and a presentation time. Referring to FIG. 7, an open rectangle indicates an MMT packet in a case in which the delay amount Δt is not generated, and a hatched rectangle indicates an MMT packet in a case in which the delay amount Δt is generated. Note that packet reorder is not considered in FIG. 7. As is apparent from FIG. 7, if a delay is generated by multiplexing processing, the receiving apparatus 20 delays the presentation time by the delay amount. That is, the receiving apparatus 20 can avoid a buffer underflow.

As described above, in the first embodiment, the multiplexing apparatus 13 includes the delay amount Δt associated with the multiplexing processing of the multiplexing apparatus 13 in the time stamp representing the presentation time Tp of the SI packet. The multiplexing apparatus 13 transmits the SI packet whose presentation time Tp includes the delay amount Δt to the receiving apparatus 20. The multiplexing apparatus 13 can thus notify the receiving apparatus 20 of the delay amount Δt associated with the multiplexing processing.

Hence, the multiplexing apparatus 13 according to the first embodiment can cause the receiving apparatus 20 to display the MMT stream without causing a buffer underflow even if a processing delay occurs in the multiplexing apparatus 13.

In the first embodiment, the receiving apparatus 20 causes the delay amount acquisition unit 25 to read the presentation time Tp+Δt and the output time Tt2 from the time stamp added to the SI packet. The delay amount acquisition unit 25 compares the output time Tt2 with the reception time of the MMT packet, and calculates the delay time Δd by the transmission channel. The delay amount acquisition unit 25 calculates Δt+Δd as the adjustment amount of the presentation time. The display unit 210 displays the video at the time Tp+Δt+Δd including the adjustment amount. The receiving apparatus 20 can thus display the video at the time including the transmission delay Δd and the delay Δt by the multiplexing processing of the multiplexing apparatus.

Hence, the receiving apparatus 20 according to the first embodiment can display the MMT stream without causing a buffer underflow even if a processing delay occurs in the multiplexing apparatus 13.

Note that in the first embodiment, an example in which the encoding apparatus 12 defines the "MPU_timestamp_descriptor" shown in FIG. 2 has been described. However, the present invention is not limited to this. For example, the encoding apparatus 12 need not provide "mpu_presentation_time_offset" in the descriptor. At this time, the multiplexing apparatus 13 writes the presentation time including the delay amount to "mpu_presentation_time".

Instead of defining "mpu_presentation_time_offset", a descriptor having, as elements, "mpu_presentation_time" representing the presentation time including the delay amount and "mpu_presentation_time_original" representing a presentation time that does not include the delay amount may be defined. At this time, the multiplexing apparatus 13 writes the presentation time before the delay amount is added to "mpu_presentation_time" and the presentation time including the delay amount to "mpu_presentation_time_original".

The encoding apparatus 12 may define a descriptor "mpu_presentation_time_offset_descriptor", instead of expanding "mpu_presentation_time_offset" in "MPU_Timestamp_descriptor" shown in FIG. 2. In this case, the multiplexing apparatus 13 writes information about the delay amount to "mpu_presentation_time_offset_descriptor".

More specifically, if "MPU_timestamp_descriptor" includes only the presentation time information of the MPU, as shown in FIG. 8, "MPU_presentation_time_offset_descriptor" shown in FIG. 9 is used, and "mpu_presentation_time_offset" is transmitted to the receiving apparatus 20. Note that the number X of bits of "mpu_presentation_time_offset" is 64 bits (32 integer second bits and 32 fraction second bits) at maximum, as in "mpu_presentation_time". However, if the maximum value of the offset value can be defined in advance because of operation restrictions, for example, a total of 32 bits including 16 integer second bits and 16 fraction second bits may be set. If the maximum value of the offset value is smaller than 1 sec, only 16 or 32 fraction second bits may be set.

The data structure of "MPU_presentation_time_offset_descriptor" is not limited to the structure shown in FIG. 9. For example, since "mpu_presentation_time_offset" is assumed to rarely frequently change, a data structure configured to send only one offset, as shown in FIG. 10, may be used. The data structures shown in FIGS. 9 and 10 may be provided with a reserved field in consideration of future expandability.

FIG. 11 is a syntax chart showing the data structure of "MP_table" that stores "MPU_Timestamp_descriptor". "MPU_Timestamp_descriptor" is stored in "asset_descriptors_byte". "MPU_presentation_time_offset_descriptor" may also be stored in "asset_descriptors_byte". If the offset value does not change for each asset such as a video or audio, "MPU_timestamp_descriptor" and "MPU_presentation_time_offset_descriptor" may be stored in "MP_table_descriptors_byte".

The encoding apparatus 12 may write time information such as the presentation time not to the descriptor but to an application layer of a level higher than the MMT packet. In this case, the delay amount setting unit 133 of the multiplexing apparatus 13 adds an offset including the delay amount by multiplexing processing in the application layer.

In this case, the receiving apparatus 20 further includes, for example, a UDP (User Datagram Protocol) parsing unit that interprets the contents of the upper application layer.

In the first embodiment, a case in which the receiving apparatus 20 provides the decoder 29 at the subsequent stage of the buffer 28 has been described as an example. However, the present invention is not limited to this. For example, the decoder 29 may be provided at the preceding stage of the buffer 28. At this time, the buffer 28 holds video/audio data decoded by the decoder 29. The presentation time control unit 26 controls the buffer 28 such that the video/audio data held by the buffer 28 is output at the time Tp+Δt+Δd. When the decoder 29 is provided at the subsequent stage of the buffer 28, the capacity of the buffer 28 can be suppressed small.

Second Embodiment

FIG. 12 is a block diagram showing an example of the functional arrangement of a broadcasting system provided with a receiving apparatus according to the second embodiment. The broadcasting system shown in FIG. 12 includes pieces of transmission equipment 10-1 and 10-2 and a receiving apparatus 30. Each of the pieces of transmission equipment 10-1 and 10-2 transmits an MMT stream. The transmitted MMT stream arrives at the receiving apparatus 30 via a transmission channel such as a broadcasting network. The receiving apparatus 30 receives the MMT stream.

Note that the arrangement of the pieces of transmission equipment 10-1 and 10-2 is the same as that of the transmission equipment 10 according to the first embodiment. However, multiplexing processing by a multiplexing apparatus 13-1 of the transmission equipment 10-1 is executed by a delay amount of 0, and multiplexing processing by a multiplexing apparatus 13-2 of the transmission equipment 10-2 is executed by a delay amount Δt for the descriptive convenience.

Accordingly, the output time represented by a time stamp added to an MMT packet output from the multiplexing apparatus 13-1 is Tt1, and the presentation time represented by a time stamp added to an SI packet is Tp. On the other hand, the output time represented by a time stamp added to an MMT packet output from the multiplexing apparatus 13-2 is Tt2 (that is, Tt1+Δt), and the presentation time represented by a time stamp added to an SI packet is Tp+Δt.

Figure 13:
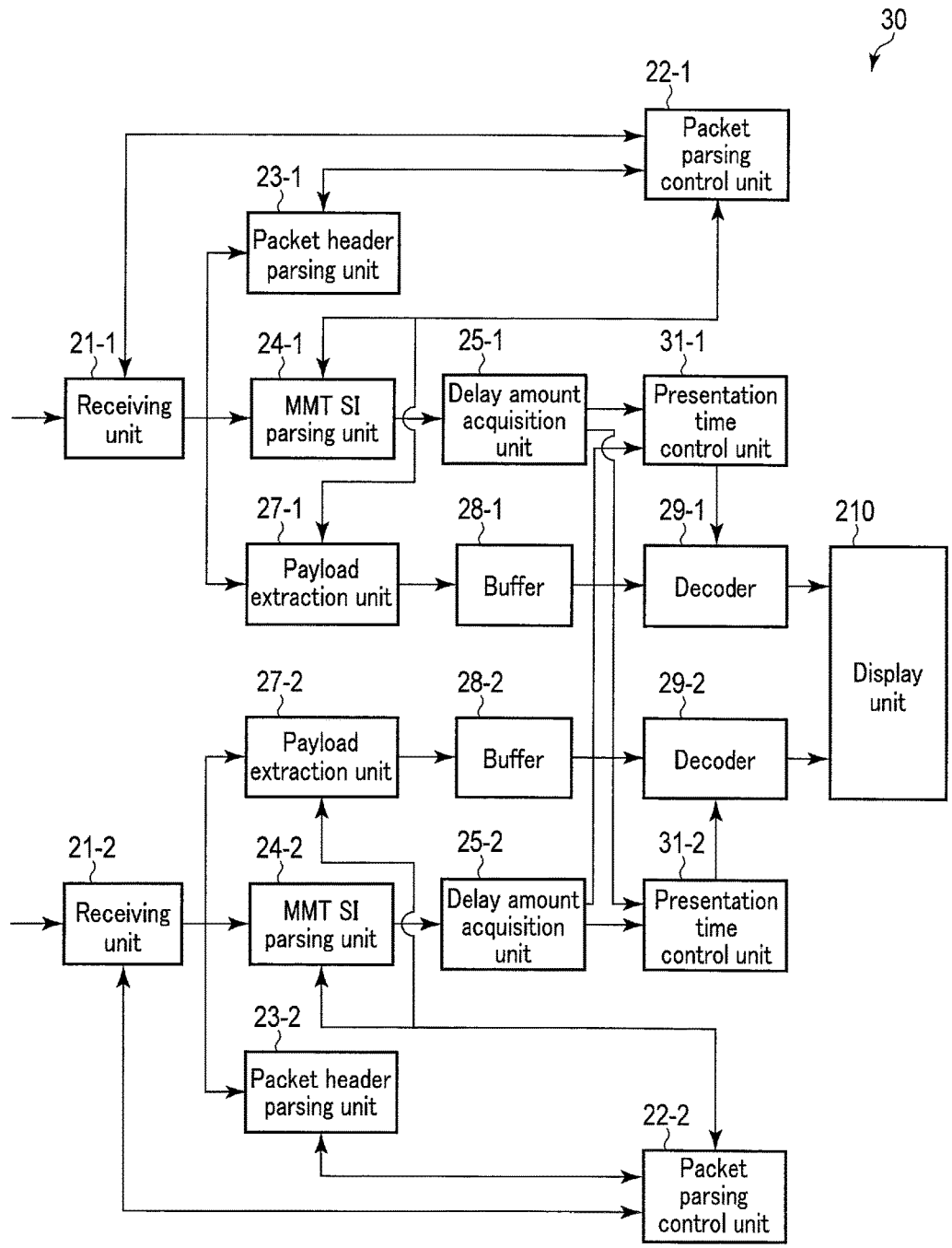
FIG. 13 is a block diagram showing the functional arrangement of the receiving apparatus shown in FIG. 12.

The receiving apparatus 30 includes, for example, a CPU, an FPGA that executes predetermined processing under the control of the CPU, a storage memory used to store data, and the like. The receiving apparatus 30 implements functions shown in FIG. 13 by causing the CPU to execute functions designed by the FPGA. FIG. 13 is a block diagram showing an example of the functional arrangement of the receiving apparatus 30 shown in FIG. 12. The receiving apparatus 30 shown in FIG. 13 implements the functions of receiving units 21-1 and 21-2, packet parsing control units 22-1 and 22-2, packet header parsing units 23-1 and 23-2, MMT-SI parsing units 24-1 and 24-2, delay amount acquisition units 25-1 and 25-2, presentation time control units 31-1 and 31-2, payload extraction units 27-1 and 27-2, buffers 28-1 and 28-2, decoders 29-1 and 29-2, and a display unit 210. Note that the receiving apparatus 30 may include an LSI in place of the FPGA, thereby implementing the functions shown in FIG. 13. The receiving apparatus 30 may implement the functions shown in FIG. 13 by software processing of the CPU.

The delay amount acquisition unit 25-1 acquires a delay amount from the SI packet included in the MMT packet output from the transmission equipment 10-1. That is, the delay amount acquisition unit 25-1 reads the presentation time Tp and the output time Tt1 from the time stamp added to the SI packet. The delay amount acquisition unit 25-1 compares the output time Tt1 with the reception time of the MMT packet acquired based on the NTP, and calculates a delay time Δd1 by the transmission channel. The delay amount acquisition unit 25-1 outputs Δd1 to the presentation time control units 31-1 and 31-2 as the adjustment amount of the presentation time.

The delay amount acquisition unit 25-2 acquires a delay amount from the SI packet included in the MMT packet output from the transmission equipment 10-2. That is, the delay amount acquisition unit 25-2 reads the presentation time Tp+Δt and the output time Tt2 from the time stamp added to the SI packet. The delay amount acquisition unit 25-2 compares the output time Tt2 with the reception time of the MMT packet acquired based on the NTP, and calculates a delay time Δd2 by the transmission channel. The delay amount acquisition unit 25-2 outputs Δt+Δd2 to the presentation time control units 31-1 and 31-2 as the adjustment amount of the presentation time.

The presentation time control unit 31-1 receives the adjustment amounts of the presentation time output from the delay amount acquisition units 25-1 and 25-2. The presentation time control unit 31-1 compares the acquired adjustment amounts, and selects the maximum adjustment amount. The presentation time control unit 31-1 controls the decoder 29-1 to start display at time considering the selected adjustment amount.

That is, the presentation time control unit 31-1 compares the adjustment amount Δd1 output from the delay amount acquisition unit 25-1 with the adjustment amount Δt+Δd2 output from the delay amount acquisition unit 25-2, and determines that the adjustment amount Δt+Δd2 is larger. The presentation time control unit 31-1 selects the adjustment amount Δt+Δd2. The presentation time control unit 31-1 controls the decoder 29-1 to start display at time Tp+Δt+Δd2 considering the selected adjustment amount.

The presentation time control unit 31-2 receives the adjustment amounts of the presentation time output from the delay amount acquisition units 25-1 and 25-2. The presentation time control unit 31-2 compares the acquired adjustment amounts, and selects the maximum adjustment amount. The presentation time control unit 31-2 controls the decoder 29-2 to start display at time considering the selected adjustment amount.

That is, the presentation time control unit 31-2 compares the adjustment amount Δd1 output from the delay amount acquisition unit 25-1 with the adjustment amount Δt+Δd2 output from the delay amount acquisition unit 25-2, and determines that the adjustment amount Δt+Δd2 is larger. The presentation time control unit 31-1 selects the adjustment amount Δt+Δd2. The presentation time control unit 31-2 controls the decoder 29-2 to start display at time Tp+Δt+Δd2 considering the decided adjustment amount.

Figure 14:
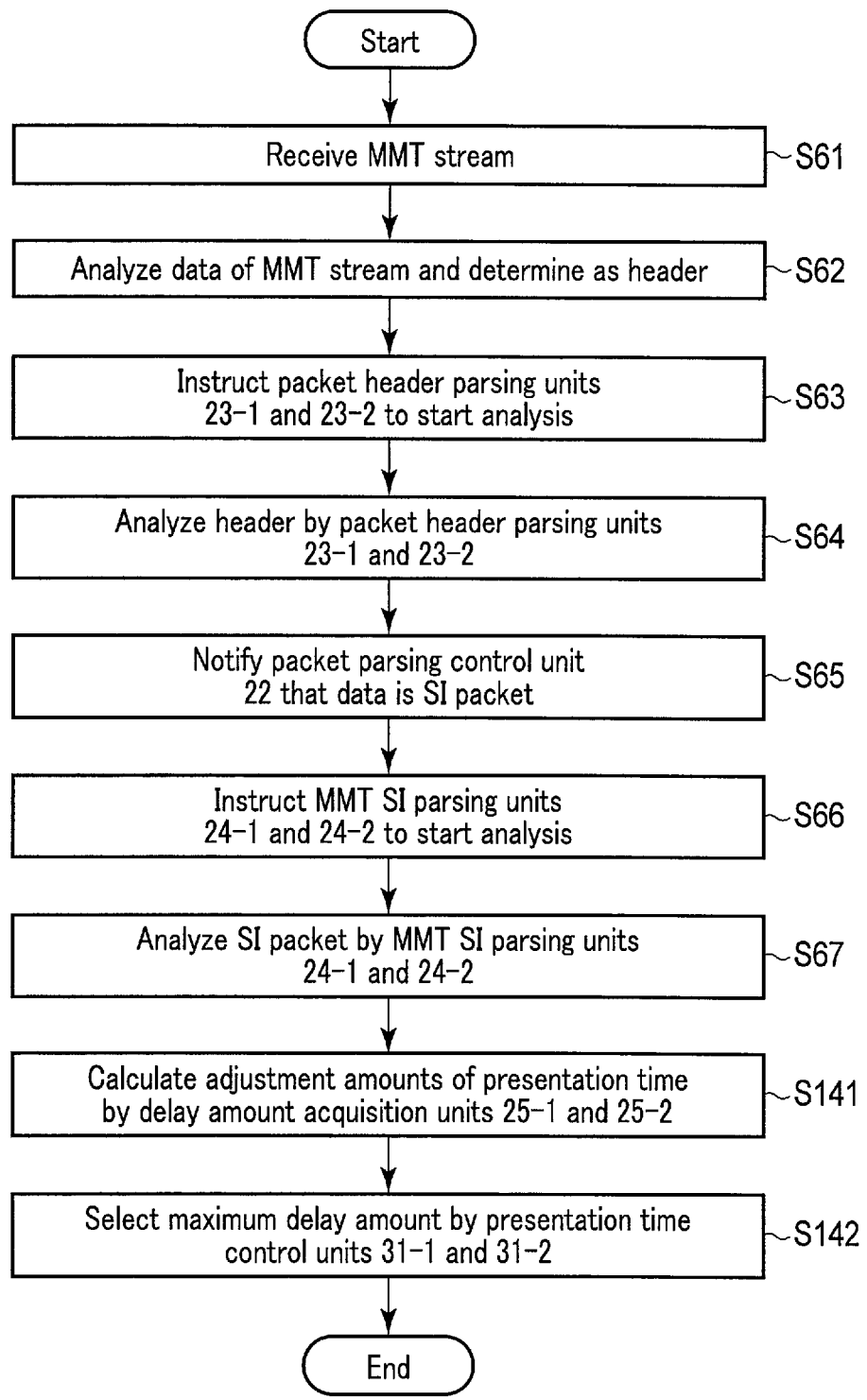
FIG. 14 is a flowchart performed when the receiving apparatus shown in FIG. 13 sets the adjustment amount of the presentation time of a video.

FIG. 14 is a flowchart performed when the receiving apparatus 30 shown in FIG. 13 sets the adjustment amount of the presentation time of a video. The receiving units 21-1 and 21-2, the packet parsing control units 22-1 and 22-2, the packet header parsing units 23-1 and 23-2, and the MMT-SI parsing units 24-1 and 24-2 execute the processes of steps S61 to S67 shown in FIG. 6.

After step S67, the delay amount acquisition unit 25-1 reads the presentation time Tp and the output time Tt1 from the time stamp added to the SI packet. The delay amount acquisition unit 25-1 calculates the delay time Δd1 by the transmission channel from the output time Tt1 and the reception time of the MMT packet. The delay amount acquisition unit 25-1 obtains $\Delta d1$ as the adjustment amount of the presentation time. The delay amount acquisition unit 25-2 reads the presentation time $Tp+\Delta t$ and the output time Tt2 from the time stamp added to the SI packet. The delay amount acquisition unit 25-2 calculates the delay time $\Delta d2$ by the transmission channel from the output time Tt2 and the reception time of the MMT packet. The delay amount acquisition unit 25-2 obtains $\Delta t+\Delta d2$ as the adjustment amount of the presentation time (step S141).

The presentation time control units 31-1 and 31-2 compare the adjustment amount $\Delta d1$ calculated by the delay amount acquisition unit 25-1 with the adjustment amount $\Delta t+\Delta d2$ calculated by the delay amount acquisition unit 25-2, and selects the adjustment amount $\Delta t+\Delta d2$ of the larger delay amount as the adjustment amount of the presentation time (step S142).

Figure 15:
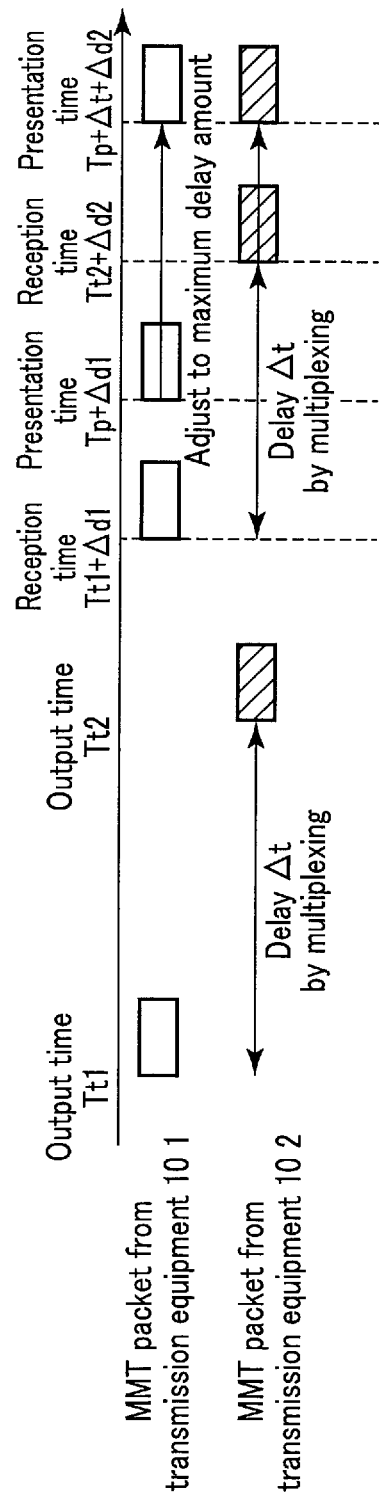
FIG. 15 is a schematic diagram showing the packet output times, the packet reception times, and the presentation times of MMT packets output from pieces of transmission equipment shown in FIG. 12.

FIG. 15 is a schematic view showing the packet output times, the packet reception times, and the presentation times of MMT packets output from the pieces of transmission equipment 10-1 and 10-2 shown in FIG. 12. Referring to FIG. 15, an open rectangle indicates an MMT packet output from the transmission equipment 10-1, and a hatched rectangle indicates an MMT packet output from the transmission equipment 10-2. Note that packet reorder is not considered in FIG. 15. As is apparent from FIG. 15, if there is a difference between times needed for multiplexing processing between the transmission equipment 10-1 and the transmission equipment 10-2, the receiving apparatus 30 adjusts the presentation time of the shorter delay time to the presentation time of the longer delay time. That is, the receiving apparatus 30 can adjust the presentation time of the output MMT packet to the time $Tp+\Delta t+\Delta d2$.

As described above, in the second embodiment, the multiplexing apparatus 13-2 includes the delay amount $\Delta t$ associated with the multiplexing processing of the multiplexing apparatus 13-2 in the time stamp representing the presentation time Tp of the SI packet. The multiplexing apparatus 13-2 transmits the SI packet whose presentation time Tp includes the delay amount $\Delta t$ to the receiving apparatus 30. The multiplexing apparatus 13-2 can thus notify the receiving apparatus 30 of the delay amount $\Delta t$ associated with the multiplexing processing.

In the second embodiment, the receiving apparatus 30 causes the delay amount acquisition unit 25-1 to calculate $\Delta d1$ as the adjustment amount of the presentation time from the presentation time Tp and the output time Tt1 represented by the time stamp added to the SI packet. The delay amount acquisition unit 25-2 calculates $\Delta t+\Delta d2$ as the adjustment amount of the presentation time from the presentation time $Tp+\Delta t$ and the output time Tt2 represented by the time stamp added to the SI packet. The presentation time control units 31-1 and 31-2 compare the adjustment amount $\Delta d1$ output from the delay amount acquisition unit 25-1 with the adjustment amount $\Delta t+\Delta d2$ output from the delay amount acquisition unit 25-2, and decides the adjustment amount $\Delta t+\Delta d2$ of the larger delay amount as the adjustment amount of the receiving apparatus 30.

As shown in the second embodiment, in a case in which a plurality of pieces of transmission equipment exist, even if the delay amount caused by the multiplexing processing is added to the time stamp for each multiplexing apparatus provided in the transmission equipment, the delay amounts are different. For this reason, even if the receiving apparatus can adjust the delay amount, the presentation times cannot be synchronized between the pieces of transmission equipment as long as the delay amount is independently processed for each transmission equipment. According to the second embodiment, the presentation time control units 31-1 and 31-2 compare the delay amount of the MMT stream transmitted from the transmission equipment 10-1 with the delay amount of the MMT stream transmitted from the transmission equipment 10-2, and control the decoders 29-1 and 29-2 using the larger one of the delay amounts. Hence, the receiving apparatus 30 can adjust the delay amounts even if there exist a plurality of pieces of transmission equipment.

Hence, the receiving apparatus 30 according to the second embodiment can display the MMT streams output from the pieces of transmission equipment 10-1 and 10-2 in synchronism even if the multiplexing apparatuses 13-1 and 13-2 have different processing delays.

Note that in the second embodiment, an example in which the receiving apparatus 30 has the arrangement shown in FIG. 13 has been described. However, the present invention is not limited to this. For example, the receiving apparatus 30 may implement components shown in FIG. 16 by causing the CPU to execute functions designed by the FPGA. According to FIG. 16, the receiving apparatus 30 implements the functions of the receiving units 21-1 and 21-2, the packet parsing control units 22-1 and 22-2, the packet header parsing units 23-1 and 23-2, the MMT-SI parsing units 24-1 and 24-2, the delay amount acquisition units 25-1 and 25-2, a comparison unit 32, a presentation time control unit 33, the payload extraction units 27-1 and 27-2, the buffers 28-1 and 28-2, the decoders 29-1 and 29-2, and the display unit 210.

The comparison unit 32 receives the adjustment amounts of the presentation time output from the delay amount acquisition units 25-1 and 25-2. The comparison unit 32 compares the acquired adjustment amounts, and selects the maximum adjustment amount. The comparison unit 32 outputs the selected adjustment amount to the presentation time control unit 33.

The presentation time control unit 33 controls the decoders 29-1 and 29-2 to start display at time considering the adjustment amount selected by the comparison unit 32.

In the second embodiment, a case in which the receiving apparatus 30 provides the decoders 29-1 and 29-2 at the subsequent stages of the buffers 28-1 and 28-2 has been described as an example. However, the present invention is not limited to this. For example, the decoders 29-1 and 29-2 may be provided at the preceding stages of the buffers 28-1 and 28-2. At this time, the buffers 28-1 and 28-2 hold video/audio data decoded by the decoders 29-1 and 29-2. The presentation time control units 31-1 and 31-2 control the buffers 28-1 and 28-2 such that the video/audio data held by the buffers 28-1 and 28-2 are output at the time $Tp+\Delta t+\Delta d2$ of the larger delay amount. When the decoders 29-1 and 29-2 are provided at the subsequent stages of the buffers 28-1 and 28-2, the capacities of the buffers 28-1 and 28-2 can be suppressed small.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The appended claims and their equivalents are intended to cover such forms or modifications as would fall within the scope and spirit of the inventions.

What is claimed is:

1. A multiplexing apparatus comprising:
processing circuitry configured to
multiplex a plurality of MMT (MPEG Multimedia Transport) packets including at least one MMT packet to which first output time information representing a first output time at which the MMT packet is output from another apparatus and presentation time information representing a presentation time at which an accessible data unit formed from a payload is displayed are added;
rewrite the first output time information to second output time information representing a second output time at which the MMT packet is output; and
add a time necessary to multiplex the plurality of MMT packets to the presentation time represented by the presentation time information as a delay time.

2. The multiplexing apparatus according to claim 1, wherein the processing circuitry includes the delay time in the presentation time information.

3. The multiplexing apparatus according to claim 1, wherein the processing circuitry adds second presentation time information representing the delay time to the MMT packet to which the presentation time information is added.

4. The multiplexing apparatus according to claim 1, wherein if the presentation time is written to an application layer of a level higher than the MMT packet, the processing circuitry adds an offset including the delay time in the application layer.

5. The multiplexing apparatus according to claim 1, wherein the processing circuitry adds a difference between the first output time and an arrival time of the MMT packet to the delay time as a delay by a transmission channel.

6. A multiplexing method comprising:
multiplexing a plurality of MMT (MPEG Multimedia Transport) packets including at least one MMT packet to which first output time information representing a first output time at which the MMT packet is output from an apparatus at a preceding stage and presentation time information representing a presentation time at which an accessible data unit formed from a payload is displayed are added;
rewriting the first output time information to second output time information representing a second output time at which the multiplexed MMT packet is output; and
adding a time necessary to multiplex the plurality of MMT packets to the presentation time represented by the presentation time information as a delay time.

7. The multiplexing method according to claim 6, wherein a total time obtained by adding a difference between the first output time and an arrival time of the MMT packet to the delay time is added to the presentation time represented by the presentation time information.

* * * * *